United States Patent
Jiang et al.

(10) Patent No.: US 7,554,743 B2
(45) Date of Patent: Jun. 30, 2009

(54) VARIABLE-FOCUS LENS ASSEMBLY

(75) Inventors: Hongrui Jiang, Madison, WI (US); Abhishek K. Agarwal, Madison, WI (US); Liang Dong, Madison, WI (US); David J. Beebe, Monona, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 330 days.

(21) Appl. No.: 11/442,927

(22) Filed: May 30, 2006

(65) Prior Publication Data

US 2007/0279758 A1 Dec. 6, 2007

(51) Int. Cl.
G02B 1/06 (2006.01)
(52) U.S. Cl. ........................ 359/666; 359/665
(58) Field of Classification Search .......... 359/665–667
See application file for complete search history.

(56) References Cited

U.S. PATENT DOCUMENTS

| | | | |
|---|---|---|---|
| 6,369,954 B1 | 4/2002 | Berge et al. | |
| 7,068,439 B2 * | 6/2006 | Esch et al. | 359/666 |
| 7,085,065 B2 * | 8/2006 | Silver | 359/666 |
| 7,327,524 B2 * | 2/2008 | Renders et al. | 359/666 |
| 7,359,124 B1 * | 4/2008 | Fang et al. | 359/666 |
| 7,382,544 B2 * | 6/2008 | Cernasov | 359/666 |
| 2007/0177276 A1 * | 8/2007 | D'ardhuy et al. | 359/666 |
| 2007/0211207 A1 * | 9/2007 | Lo et al. | 351/41 |
| 2008/0259463 A1 * | 10/2008 | Shepherd | 359/666 |

OTHER PUBLICATIONS

Article from *Nature Publishing Group*, vol. 425, pp. 383-385 dated Sep. 2003, entitled "Video-Speed electronic paper based on electrowetting," by Robert A. Hayes and B.J. Feenstra.
Article from Economist.com, *Science Technology Quarterly*, dated Jun. 10, 2004, pp. 1-4, Entitled "Material:: Smart-fluid technology is moving from laboratory curiosity to commercial possibility, and is being put to use in cars, bridges and even digital cameras."

* cited by examiner

*Primary Examiner*—Jordan M. Schwartz
(74) *Attorney, Agent, or Firm*—Boyle Fredrickson, S.C.

(57) ABSTRACT

A variable-focus lens assembly is provided. The lens assembly includes a microfluidic device that defines a chamber for receiving a fluid therein. A slip having an aperture therethrough is disposed in the chamber. A first fluid is disposed on the first side of the slip and a second fluid is disposed on the second side of the slip. A lens is formed from the interface of the first and second fluids. The outer periphery is pinned to the slip about the aperture. A turning structure fabricated from a hydrogel material engages the slip and tunes the focal length of the lens in response to a predetermined stimulus.

8 Claims, 3 Drawing Sheets

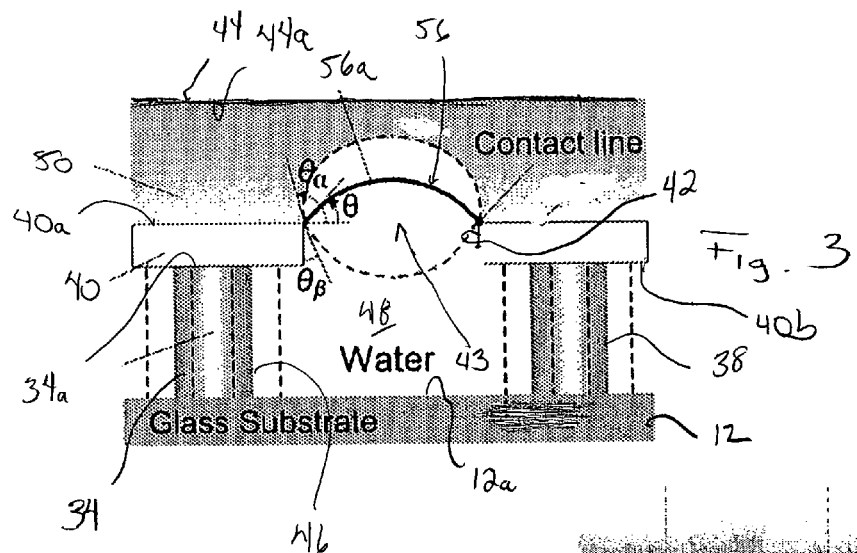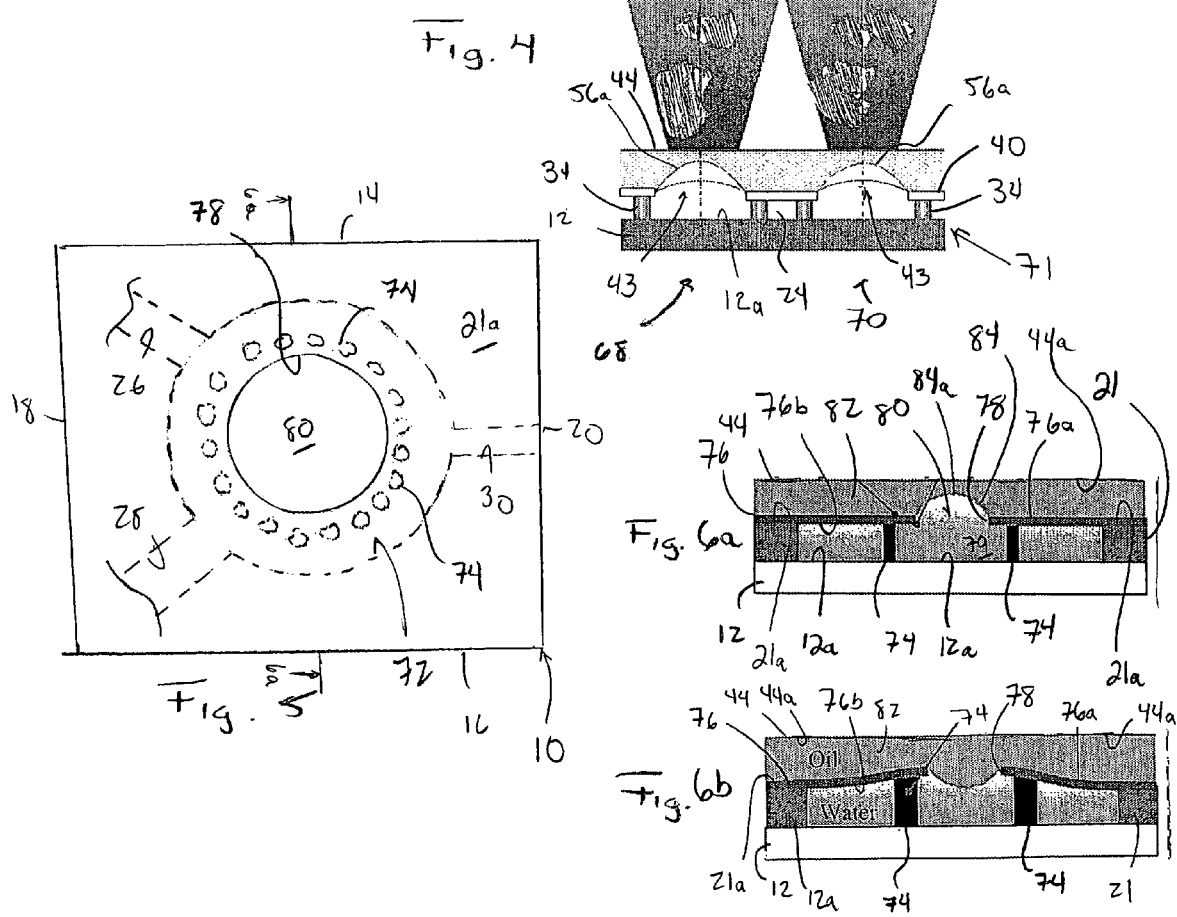

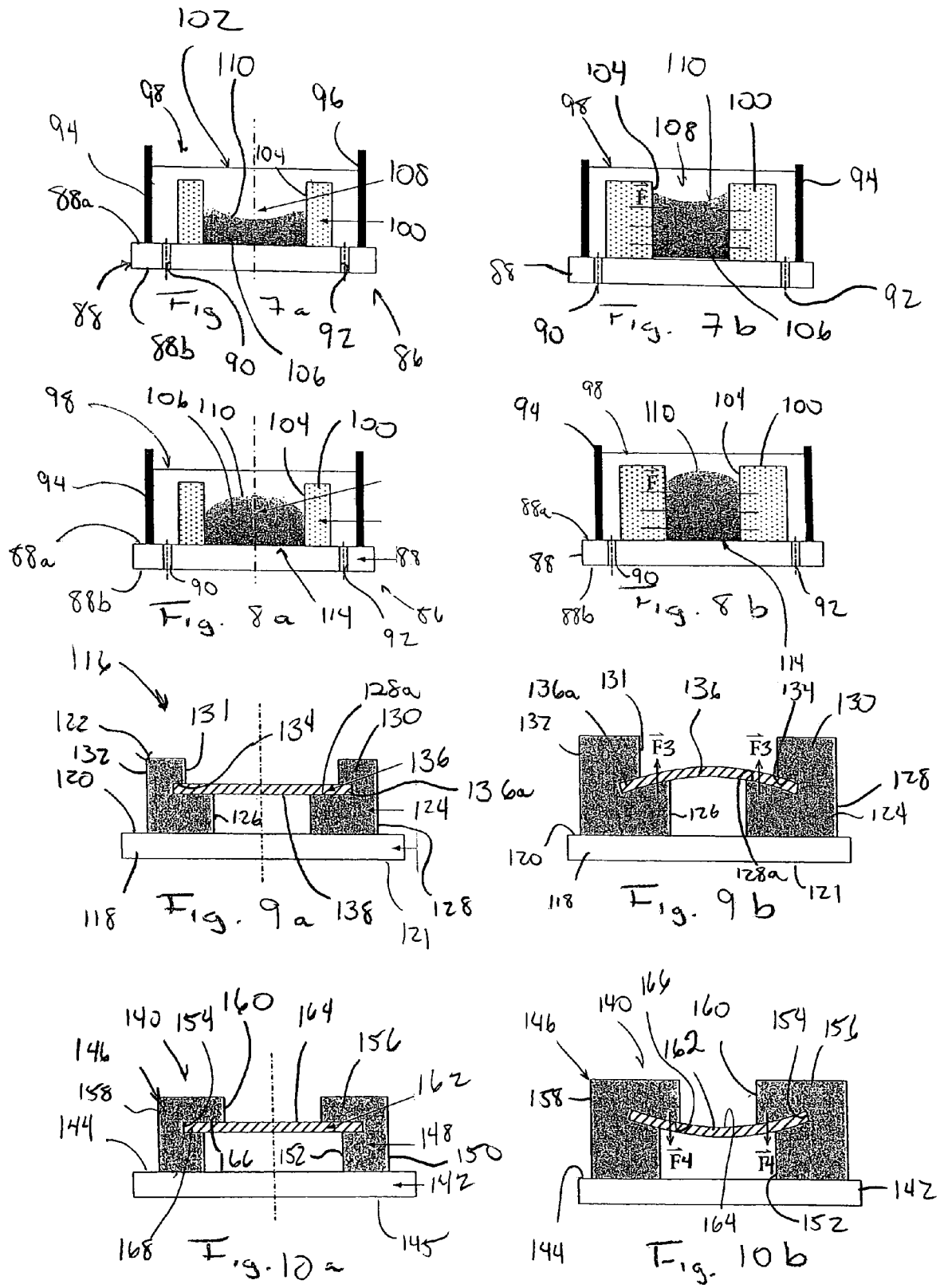

VARIABLE-FOCUS LENS ASSEMBLY

FIELD OF THE INVENTION

This invention relates generally to microfluidic devices, and in particular, to a variable-focus optical microlens that is self-regulating and allows for the tuning of the microlens without any external control or power consumption.

BACKGROUND AND SUMMARY OF THE INVENTION

Traditional man-made optical systems are comprised of multiple lenses wherein one or more of the lenses are physically displaced to realize variable-focus. Nature, however, accomplishes this same function much more elegantly with an individual lens. For example, in the human eye, ciliary muscles are controlled by the body's nervous system, thereby relaxing and contracting the shape of a human eye lens to enable the eye to focus on different distances. Although advancements in miniaturization technologies have led to single microlens embodiments that are widely used in photonics, displays, and biomedical systems, these microlens technologies rely on either fixed focal length or externally-controlled variable-focus microlenses.

By way of example, Berge et. al., U.S. Pat. No. 6,369,953 discloses a variable-focus lens that utilizes a voltage potential to vary the focal length. More specifically, the lens includes a dielectric chamber having a drop of a transparent, insulating liquid deposited on an inner surface thereof. The dielectric chamber is filled with a transparent, conductor liquid. The insulating liquid and the dielectric liquid have different optical indexes and have substantially the same density. A first electrode is placed on the external surface of the wall of the dielectric chamber on which is situated the insulating drop. A second electrode is electrically coupled to conductor liquid. When a voltage is established between the first and second electrodes, an electric field is created which causes the conductor liquid to move and deform the insulating liquid. This, in turn, results in a variation in the focus of the intersection of the insulating liquid and the conducting liquid, or in other words, the lens.

While functional for their intended purpose, these prior microlenes have certain inherent limitations. For example, prior variable-focus lenses generally have a small tuning range of focal lengths. Further, in order to increase the flexibility in the design and operation of the microlens in various applications, it is highly desirable for the mircolens to be responsive to various environmental parameters presented in such applications. However, since the prior microlenses utilize external controls, such self-regulation is not feasible. It must also be noted when the prior microlenses are used to observe a biological sample, the voltage used to manipulate the focal length of the microlens may have an adverse effect on the sample. Consequently, it is highly desirable to provide a variable-focus microlens that is self-regulating and that allows for the tuning of the microlens without any external control or power consumption.

Therefore, it is a primary object and feature of the present invention to provide a variable-focus optical microlens that is autonomously tuned by local environmental parameters.

It is a further object and feature of the present invention to provide a variable-focus optical microlens that automatically adjusts the focal length thereof without the need for external control systems.

It is a still further object and feature of the present invention to provide a variable-focus optical microlens that is compact and easily fabricated.

In accordance with the present invention, a variable-focus lens assembly is provided. The lens assembly includes a slip having first and second sides and an inner wall defining an aperture therethrough. A lens is disposed across the aperture. A hydrogel structure engages the slip. The hydrogel structure is movable between a first configuration wherein the lens has a first focal length and a second configuration wherein the lens has a second focal length in response to a predetermined stimulus.

The variable-focus lens assembly also includes a base and the hydrogel structure is generally ring-shaped and defines a cavity therethrough. The hydrogel structure is disposed between the base and the second side of the slip such that the cavity communicates with the aperture though the slip. Alternatively, the hydrogel structure may include a plurality of circumferentially spaced posts disposed between the base and the second side of the slip about the aperture though the slip.

The lens may be fabricated from a transparent film or from first and second layers having an interface. The interface has an outer periphery that is pinned to the inner wall of microfluidic device. It is contemplated for the first layer to be formed from an oil-based fluid and the second layer to be formed from a water-based fluid.

In accordance with a further aspect with the present invention, a variable-focus lens assembly is provided. The lens assembly includes a microfluidic device defining a chamber for receiving a fluid therein. A lens is disposed in the chamber and has a tunable focal length. A tuning structure is provided for tuning the focal length of the lens in response to a predetermined stimulus.

The lens assembly also includes a base and a slip spaced from the base. The slip has an aperture therethough. The tuning structure includes a hydrogel disposed between the slip and the base. The hydrogel has a configuration alterable between a first configuration wherein the lens has a first focal length and a second configuration wherein the lens has a second focal length in response to the predetermined stimulus. Alternatively, the tuning structure may include a plurality of circumferentially spaced posts disposed between the base and the second side of the slip about the aperture though the slip. Each post has a configuration alterable between a first configuration and a second configuration in response to the predetermined stimulus.

The lens may be fabricated from a transparent film or from first and second layers having an interface. The interface has an outer periphery that is pinned to an inner wall of the slip. It is contemplated for the first layer to be formed from an oil-based fluid and the second layer to be formed from a water-based fluid.

In accordance with a still further aspect of the present invention, a variable-focus lens assembly is provided. The lens assembly includes a microfluidic device defining a chamber for receiving a fluid therein. A slip is disposed in the chamber. The slip has first and second sides and an inner wall defining an aperture therethrough. A first fluid is disposed on the first side of the slip and a second fluid is disposed on the second side of the slip. A lens having a focal length is positioned at the boundary of the first and second fluids. A tuning structure tunes the focal length of the lens in response to a predetermined stimulus.

The variable-focus lens assembly includes a base spaced from the slip and the tuning structure includes a hydrogel ring disposed between the slip and the base. The ring has a configuration alterable between a first configuration wherein the lens has a first focal length and a second configuration wherein the lens has a second focal length in response to the predetermined stimulus. Alternatively, the tuning structure may include a plurality of circumferentially spaced posts disposed between the base and the second side of the slip about the aperture though the slip. Each post has a configuration alterable between a first configuration and a second configuration in response to the predetermined stimulus.

The lens may be fabricated from a transparent film or from first and second layers having an interface. The interface has an outer periphery that is pinned to the inner wall of the slip. It is contemplated for the first layer to be formed from an oil-based fluid and the second layer to be formed from a water-based fluid.

BRIEF DESCRIPTION OF THE DRAWINGS

The drawings furnished herewith illustrate a preferred methodology of the present invention in which the above advantages and features are clearly disclosed as well as others which will be readily understood from the following description of the illustrated embodiment.

In the drawings:

FIG. 3 is a cross-sectional view of the microfluidic device incorporating the microlens of the present invention taken along line 3-3 of FIG. 2

FIG. 4 is an alternate embodiment of a microfluidic device incorporating multiple microlenses in accordance with the present invention;

FIG. 5 is a top plan view, partially in section, showing a microfluidic device incorporating a second embodiment of the microlens in accordance with the present invention;

FIG. 6a is a cross-sectional view of the microfluidic device taken along line 6a-6a of FIG. 5 wherein the microlens has a first configuration;

FIG. 6b is a cross-sectional view, similar to FIG. 6a, wherein the microlens has a second configuration;

FIG. 7a is a side elevational view of a third embodiment of a microlens in accordance with the present invention having a first configuration;

FIG. 7b is a side elevational view of the microlens of FIG. 7a having a second configuration;

FIG. 8a is a side elevational view of a fourth embodiment of a microlens in accordance with the present invention having a first configuration;

FIG. 8b is a side elevational view of the microlens of FIG. 8a having a second configuration;

FIG. 9a is a side elevational view of a fifth embodiment of a microlens in accordance with the present invention having a first configuration;

FIG. 9b is a side elevational view of the microlens of FIG. 9a having a second configuration;

FIG. 10a is a side elevational view of a sixth embodiment of a microfluidic device of the present invention having a first configuration; and FIG. 10b is a cross-sectional view of the microlens of FIG. 10a having a second configuration.

DETAILED DESCRIPTION OF THE DRAWINGS

Figure 1:
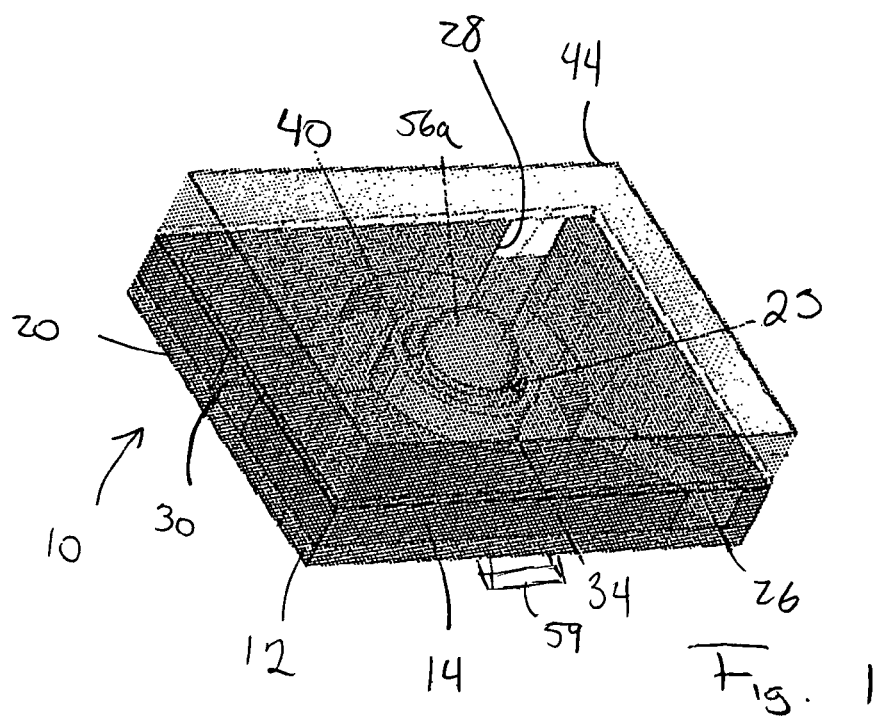
FIG. 1 is an isometric view of a microfluidic device incorporating a microlens in accordance with the present invention.
Figure 2:
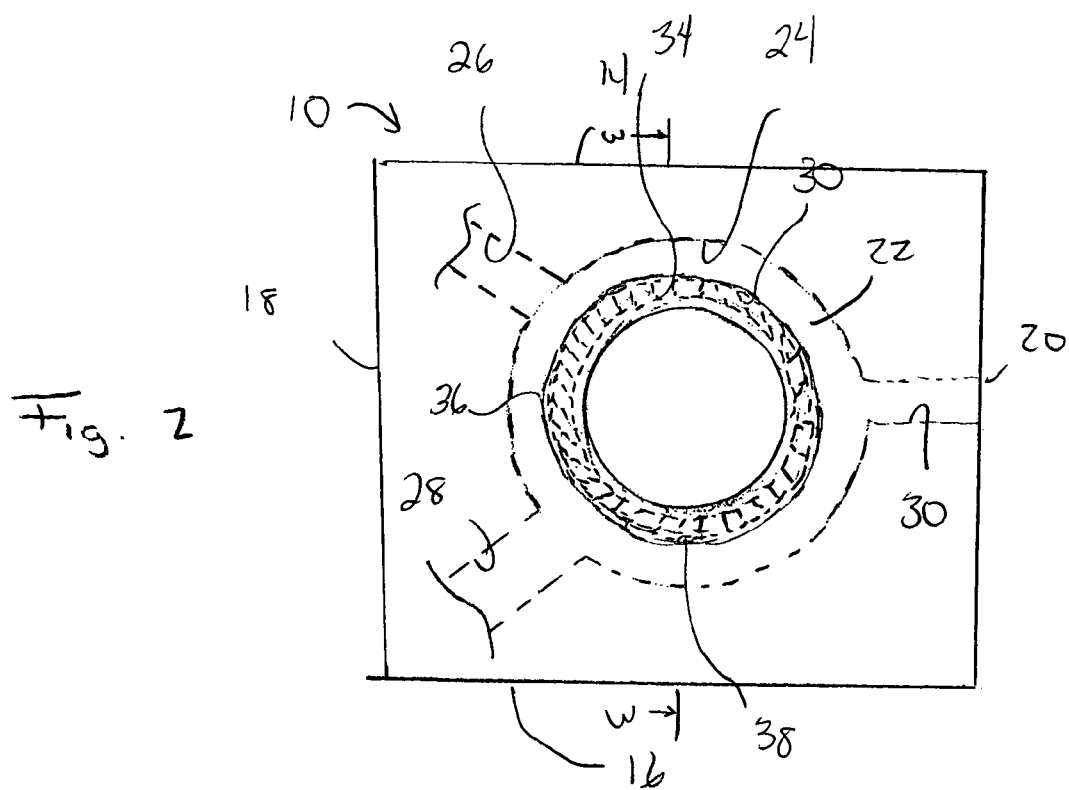
FIG. 2 is a top plan view, partially in section, showing the microfluidic device of FIG. 1.

Referring to FIGS. 1-3, a microfluidic device incorporating a first embodiment of a microlens in accordance with the present invention is generally designated by reference numeral 10. Microfluidic device 10 includes substrate 12 and is defined by first and second sides 14 and 16, respectively, and first and second ends 18 and 20, respectively. As described, microfluidic device 10 has a generally rectangular, box-like configuration. However, it can be appreciated that microfluidic device 10 may have other configurations without deviating from the scope of the present invention.

Mircofluidic device 10 further includes cartridge 21, FIGS. 5-6b, is deposited on substrate 12 and filled with a liquid photopolymer. A mask, corresponding in size and shape to a desired channel network 22, is positioned between cartridge 21 and an ultraviolet light source. Ultraviolet light is directed toward the liquid photopolymer such that a portion of the liquid photopolymer exposed to the ultraviolet light solidifies. Thereafter, the portion of the photopolymer that remains in a liquid state is flushed from the cartridge leaving channel network 22 within microfluidic device 10.

As best seen in FIGS. 1-2, channel network 22 includes central cavity 24 having a plurality of spokes 26, 28, and 30 extending radially therefrom. Spokes 26, 28 and 30 allow for fluid to enter into and flow through the central cavity 24 of channel network 22. It is contemplated for microlens 23 to be fabricated in central cavity 24, as hereinafter described. Mircolens 23 includes hydrogel ring 34 photopatterned, as heretofore described, on upper surface 12a of substrate 12 within central cavity 24 of channel network 22. As is known, stimuli-responsive hydrogels expend and contract in response to predetermined environmental parameters such as pH, temperature, light, electric fields and antigens.

In a first embodiment, polymer jacket 36 may be polymerized about the outer periphery 38 of hydrogel ring 34, FIG. 2, for reasons hereinafter described. Slip 40 is positioned on upper end 34a of hydrogel ring 34 and upper surface 21a of cartridge 21. Slip 40 includes inner surface 42 defining aperture 43 therethrough. Glass cover 44 is positioned over cartridge 21 so as to isolate channel network 22 from the environment external of microfluidic device 10. As described, inner surface 46 of hydrogel ring 34 defines water receiving cavity 48 within microfluidic device 10. Inner surface 44a of glass cover 44 partially defines oil receiving cavity 50 within microfluidic device 10. Water receiving cavity 48 and oil receiving cavity 50 communicate through aperture 43 in slip 40.

Inner surface 42 of slip 40 is patterned so as to utilize surface chemistry to render inner surface 42 and bottom surface 40b of slip 40 hydrophilic, and to render upper surface 40a of slip 40 hydrophobic, FIG. 3. As hereinafter described, liquid microlens 23 of the present invention is formed via a pinned water-oil interface 56 defining a liquid meniscus generally designated by the reference numeral 56a along the hydrophobic-hydrophilic contact line. While not depicted, it is also contemplated as within the scope of the present invention to provide a transparent film at water-oil interface 56 to act as the microlens. The outer periphery of the film may be pinned to inner wall 42 of slip 40. As such, as the shape of water-oil interface 56 changes, the shape, and hence the focal length, of the film is changed accordingly.

When hydrogel ring 34 is exposed to a predetermined stimulus, ring 34 expands or contracts by absorbing and releasing water, respectively, via the hydrogel network interstitials. The expansion and contraction of hydrogel ring 34 is depicted in phantom in FIG. 3. This, in turn, results in a volume change in the water deposited in water receiving cavity 48 defined by inner surface 42 of hydrogel ring 34. The net physical volume change in both the inside periphery of hydrogel ring 34 and the water received in cavity 48 causes a change in the pressure difference across the water-oil interface (P), which directly determines the shape of liquid meniscus 56a, shown in phantom in FIG. 3. The stationary pinned contact line translates a change in the water volume in water receiving cavity 48 into a change in the contact angle of the liquid meniscus (θ), and thus, the focal length of the microlens. Contact angle θ of liquid meniscus 56a may attain any value in the interval $-(90°-θ_β) \leq θ \leq θ_α$ by varying the pressure difference P across water-oil interface 56, wherein $θ_α$ is the water contact angle with upper surface 44 of slip 40 and $θ_β$ is the water contact angles on upper and lower surfaces 40a and 40b, respectively, of slip 40.

In order to fabricate a temperature-sensitive smart liquid microlens, it is contemplated for hydrogel ring 34 to be is made from a hydrogel that expands at low temperatures and contracts at high temperatures with a volume transition at a predetermined temperature, e.g. approximately 32° C. The expansion and contraction of hydrogel ring 34 only occurs within the inner periphery of the ring because of the physical restraint provided by the polymer jacket 36, FIG. 2. At low temperatures, liquid meniscus 56a grows because the added physical volume of hydrogel ring 34 is larger than the volume of the water in the middle of ring 34 lost to absorption by the hydrogel. At high temperatures, liquid meniscus 56a retreats because the water released from physical shrinking of the hydrogel is unable to compensate for the decrease in the physical volume of hydrogel ring 34. The difference between the physical volume changes of the hydrogel and the volume changes in water outside of the hydrogel is due to the different amount and structure of bound and free water within a swollen and a collapsed hydrogel.

As the temperature increases, microlens 23 changes from a divergent to a convergent lens, and the focal length is tuned from several millimeters to infinity in both positive and negative focal lengths. It is contemplated to use external heater 59 positioned against the lower surface 12b of substrate 12 to change the local environmental temperature. However, other types of heating units may be used to change the environmental temperature within microfluidic device 10 without deviating from the scope of the present invention.

Alternatively, it can be appreciated that hydrogel ring 34 may be fabricated from a hydrogel that is sensitive to the local environmental parameter such as pH. As such, by eliminating polymer jacket 36, FIG. 3, outside periphery 38 of hydrogel ring 34 can be exposed to various pH buffers provided in central cavity 24 through spokes 26, 28 and 30 such that the volume of the inner periphery of hydrogel ring 34 may be controlled.

Referring to FIG. 4, it is contemplated to extend the single liquid microlens concept shown in FIGS. 1-3, supra., to a microlens array, wherein each microlens is responsible for a predetermined area of a visual field across which an object is moving. By way of example, first and second microlenes 68 and 70, respectively, are fabricated in a single central cavity of a microfluidic device 71 to dynamically monitor two areas of the visual field. Except as hereinafter provided, first and second microlenses 68 and 70, respectively, are identical in structure to microlens 23. More specifically, first and second microlenses 68 and 70, respectively, are fabricated from hydrogels that exhibit opposite responses to the same pH environment. For example, hydrogel ring 34 of microlens 68 expands at low pH and contracts at high pH with a predetermined volume transition point, e.g., pH 7.5. Hydrogel ring 34 of second microlens 70 expands at high pH and contracts at low pH with a predetermined volume transition point, e.g. 7.5.

Initially, an initial high pH buffer is flowed into central cavity 24 of channel network 22. Thereafter, by replacing the initial high pH buffer with a low pH buffer, liquid meniscus 56a of first microlens 68 gradually bows up so as to move the focal plane closer to aperture 43 in slip 40 of first microlens 68, while second microlens 70 exhibits the opposite effect such that liquid meniscus 56a of second microlens 70 moves the focal plane further away from aperture 43 in slip 40 of second microlens 70. The object planes of first and second microlens 68 and 70, respectively, correspondingly move in space following the change of the focal lengths. As described, the liquid microlens array not only mimics the function of the compound eye to monitor different areas of a visual field, but is superior to the compound eye due to the variable-focus ability of first and second microlens 68 and 70, respectively.

It can be appreciated that the variety of multiple stimuli-responsive hydrogels can be used to engineer and implement functionally complex and smart microlens arrays to act as biological and chemical sensors (i.e., sensing of multi-environmental parameters), and subsequently generate optical outputs or visible images. These imaging-type microlenses can be fabricated across substrate 12 and each microlens or a group of microlenses can be assigned to a predetermined stimulus or environmental parameter. In addition, the hydrophobic-hydrophilic boundary interface can be realized with a variety of substrates (e.g., glass, polymer) with no strict geometrical substrate requirements. Therefore, distributed 3-D microlens arrays can be fabricated on flexible polymer substrates, thereby allowing microlens arrays with larger field of views.

Referring to FIGS. 5-6b, a still further embodiment of a microlens is generally designated by reference numeral 72. It is contemplated to fabricate mircolens 72 within central cavity 24 of channel network 22 of microfluidic device 10. Microlens 72 includes a plurality of hydrogel posts 74 circumferentially spaced from each other and extending vertically from upper surface 12a of substrate 12. When exposed to a predetermined stimulus, hydrogel posts 74 expand and contract, for reasons hereinafter described. Slip 76 is positioned on the upper ends of hydrogel posts 74 and on upper face 21a of cartridge 21. Slip 76 includes inner surface 78 defining aperture 80 therethrough. Lower surface 76b of slip 76 and upper surface 12a of substrate 12 define a cavity for receiving a water-based fluid therein. Upper surface 76a of slip 76 and lower surface 44a of glass cover 44 define an oil receiving cavity 82 for receiving oil therein. It can be appreciated that water receiving cavity 79 and oil receiving cavity 82 communicate with each other through aperture 80 in slip 76.

Inner surface 78 of slip 76 is patterned so as to utilize surface cavity chemistry to render inner surface 78 and bottom surface 76b of slip 76 hydrophilic, and to render upper surface 76a of slip 76 hydrophobic. As a result, oil-water interface 84 defining meniscus 84a is pinned along the hydrophobic-hydrophilic contact line of slip 76.

When hydrogel posts 74 are exposed to a predetermined stimulus, posts 74 expand and/or contract, as heretofore described. As hydrogel posts 74 expand, slip 76 bends upwardly thereby causing oil-water interface 84 pinned at the hydrophilic-hydrophobic boundary to bow downward. Alternatively, as hydrogel post 74 contracts, slip 76 bends downwardly such that oil-water interface 84 pinned at the hydrophilic-hydrophobic boundary of slip 76 bulges upward. In such manner, the focal length of microlens 72 is varied.

Referring to FIG. 7a, a microfluidic device incorporating a still further embodiment of a microlens in accordance with the present invention is generally designated by the reference numeral 86. Microfluidic device 86 includes substrate 88 having upper surface 88a and lower surface 88b. Inlet and outlet passageways 90 and 92, respectively, extend through substrate 88, for reasons hereinafter described. Cartridge 94 is deposited on upper surface 88a of substrate 88 and includes inner surface 96 defining cavity 98 therein. Microlens 102 includes a hydrogel ring 100 photopatterned, as heretofore described, on upper surface 88a of substrate 88 within cavity 98. Hydrogel ring 100 expands and contracts in response to a predetermined stimulus or environmental parameter such that inner surface 104 of hydrogel ring 100 is treated to be hydrophilic. Oil droplet 106 is deposited on upper surface 88a of substrate 88 within the interior of hydrogel ring 100. Water-based fluid 108 is provided in cavity 98 such that water-oil interface 110 is formed. Since inner surface 104 of hydrogel 100 is hydrophilic, water-oil interface 110 defines a concave lens.

Referring to FIG. 7b, it is contemplated to a flow water-based fluid into cavity 98 through inlet passageway 90 in substrate 88 and drawing fluid from cavity 98 through outlet passageway 92 in substrate 88. By exposing hydrogel ring 100 to a predetermined stimuli provided in water-based fluid 108, hydrogel ring 100 expands such that the diameter of the interior of hydrogel ring 100 is reduced. Due to volume change within the interior, hydrogel ring 100 exerts a force F on the oil droplet thereby varying the shape of the water-oil interface 110, and hence, changing the focal length of the lens.

Referring to FIGS. 8a-8b, a still further embodiment of a microlens in accordance with the present invention is generally designated by the reference numeral 114. The microlens 114 is identical in structure to microlens 102 except as hereinafter provided. More specifically, it is contemplated to treat inner surface 104 of hydrogel ring 100 to be hydrophobic. As a result, a convex lens is formed by oil-water interface 110. As heretofore described, when hydrogel ring 100 is exposed to a predetermined stimulus, ring 100 expands, FIG. 8b, or contracts, FIG. 8a. This, in turn, changes the shape of oil-water interface 110, and hence, the focal length of the lens defined thereby.

Referring to FIGS. 9a-9b, a still further embodiment of a microlens in accordance with the present invention is generally designated by the reference numeral 116. Microlens 116 includes substrate 118 having upper surface 120 and lower surface 121. Hydrogel ring 122 is deposited on upper surface 120 to substrate 118. Hydrogel ring 122 includes a generally cylindrical base portion 124 having inner surface 126 and outer periphery 128. Upper portion 130 of hydrogel ring 122 projects from base 124 and includes inner surface 131 and outer periphery 132. Inner surface 131 of upper portion 130 of hydrogel ring 122 includes notch 134 formed therein. Transparent film 136 is positioned within the interior of hydrogel ring 122 such that lower surface 138 of film 136 is received on upper surface 128a of base 128 of hydrogel ring 122 and such that outer periphery 136a of film 136 is received within notch 134 in inner surface 131 of upper portion 130 of hydrogel ring 122.

When hydrogel ring 122 is exposed to a predetermined stimulus, hydrogel ring 122 contracts, FIG. 9a, or expands, FIG. 9b, in response thereto. When expanding, base 124 and upper portion 130 of hydrogel ring 122 exert outward force F3 on film 136 thereby forming a convex lens from film 136. It can be appreciated that focal length of the lens formed by film 136 may be changed or tuned in response the expansion and contraction of hydrogel ring 122.

Referring to FIGS. 10a and 10b, a still further embodiment of a microlens in accordance with the present invention is generally designated by the reference numeral 140. Microlens 140 includes substrate 142 having upper surface 144 and lower surface 145. Hydrogel ring 146 is deposited on upper surface 144 of substrate 142. Hydrogel ring 146 includes base 148 having outer periphery 150 and inner wall 152. Inner wall 152 includes notch 154 formed therein, for reasons hereinafter described. An enlarged upper portion 156 extends from base 148 and includes outer periphery 158 and inner surface 160. Transparent film 162 is positioned within the interior of hydrogel ring 146 such that upper surface 164 of film 162 engages lower surface 166 of base 156 and such that outer periphery 168 of film 162 is received within notch 154 in base 148.

When hydrogel ring 146 is exposed to a predetermined stimulus, hydrogel ring 146 contracts, FIG. 10a, or expands, FIG. 10b, in response thereto. When expanding, lower surface 146 of upper portion 156 of hydrogel ring 146 exerts downward force F4 on film 162 such that film 162 forms a concave lens. As such, focal length of the lens formed by film 162 may be tuned by the expansion and contraction of hydrogel ring 146.

Alternatively, it is contemplated for film 162 to separate two fluids with different refractive indices on opposites sides thereof. The fluids and film 162 can act to form a tunable microlens as heretofore described. As described, film 162 is thin and only serves as a spacer between the fluids.

As described, the aforementioned liquid microlenses can smartly focus on objects at different distances. By working in the scale range of tens to thousands of micrometers where surface tension plays a key role in liquid behavior, these smart liquid microlenses bridge a local environmental input parameter with an optical output (i.e., variable-focus lens) through the use of stimuli-responsive hydrogels and stable pinned fluid-fluid interfaces. Also, other available hydrogels can further diversify the variable-focus mechanisms and their applications. Since the hydrogels function both as sensors and actuators without the need for complicated controlling systems and external power supplies, the microlenses of the present invention mayo be integrated with other microfluidic components to realize functionally complex, microfluidic systems.

Various modes of carrying out the invention are contemplated as being within the scope of the following claims particularly pointing out and distinctly claiming the subject matter that is regarded as the invention.

We claim:

1. A variable-focus lens assembly, comprising:
   a base;
   a sheet having first and second sides and an inner wall defining an aperture therethrough;
   a first fluid engaging at least a portion of the first side of the sheet;
   a second fluid engaging at least a portion of the second side of the sheet and engaging the first fluid through the aperture at an interface, the interface defining a lens having a shape disposed across the aperture; and
   a hydrogel structure engaging the sheet, the hydrogel structure movable between a first configuration wherein the lens has a first focal length and a second configuration wherein the lens has a second focal length in response to a predetermined stimulus;
   wherein the hydrogel structure includes a plurality of circumferentially spaced posts disposed between the base and the second side of the sheet about the aperture.

2. The variable-focus lens assembly of claim 1 wherein the outer periphery of the interface is pinned to the inner wall of the sheet.

3. The variable-focus lens assembly of claim 1 wherein the lens includes first and second layers and wherein the first layer is formed from an oil-based fluid and the second layer is formed from a water-based fluid.

4. A variable-focus lens assembly, comprising:
a microfluidic device defining a chamber for receiving a fluid therein;
a sheet disposed in the chamber, the sheet having first and second sides and an inner wall defining an aperture therethrough;
a base spaced from the sheet;
a first fluid disposed on the first side of the sheet;
a second fluid disposed on the second side of the sheet and engaging the first fluid through the aperture at an interface, the interface defining a lens having a focal length; and
a tuning structure for tuning the focal length of the lens in response to a predetermined stimulus;
wherein the tuning structure includes a hydrogel ring disposed between the sheet and the base and having a configuration alterable between a first configuration wherein the lens has a first focal length and a second configuration wherein the lens has a second focal length in response to the predetermined stimulus.

5. The variable-focus lens assembly of claim 4 wherein the outer periphery of the interface is pinned to the inner wall of the sheet.

6. The variable-focus lens assembly of claim 4 wherein the first fluid is an oil-based fluid and the second fluid is a water-based fluid.

7. A variable-focus lens assembly, comprising:
a base;
a sheet having first and second sides and an inner wall defining an aperture therethrough;
a lens having a shape disposed across the aperture; and
a hydrogel structure engaging the sheet, the hydrogel structure movable between a first configuration wherein the lens has a first focal length and a second configuration wherein the lens has a second focal length in response to a predetermined stimulus;
wherein the hydrogel structure is generally ring-shaped and defines a cavity therethrough, the hydrogel structure disposed between the base and the second side of the sheet such that the cavity communicates with the aperture though the sheet.

8. A variable-focus lens assembly, comprising:
a microfluidic device defining a chamber for receiving a fluid therein;
a sheet disposed in the chamber, the sheet having first and second sides and an inner wall defining an aperture therethrough;
a base;
a first fluid disposed on the first side of the sheet;
a second fluid disposed on the second side of the sheet and engaging the first fluid through the aperture at an interface, the interface defining a lens having a focal length; and
a tuning structure for tuning the focal length of the lens in response to a predetermined stimulus;
wherein the tuning structure includes a plurality of circumferentially spaced posts disposed between the base and the second side of the sheet about the aperture through the sheet, each post having a configuration alterable between a first configuration and a second configuration in response to the predetermined stimulus.

* * * * *